(12) United States Patent
Ginn et al.

(10) Patent No.: US 8,065,903 B2
(45) Date of Patent: Nov. 29, 2011

(54) IMPACT ENERGY ABSORBER FOR UNDERWATER APPLICATIONS

(75) Inventors: Jason R. Ginn, North Palm Beach, FL (US); Zachary A. Grabe, West Palm Beach, FL (US); Vanessa DeSha, West Palm Beach, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 209 days.

(21) Appl. No.: 12/512,535

(22) Filed: Jul. 30, 2009

(65) Prior Publication Data

US 2011/0023579 A1    Feb. 3, 2011

(51) Int. Cl.
*G01M 7/00* (2006.01)
(52) U.S. Cl. ...................................... 73/12.08
(58) Field of Classification Search ....... 73/12.01–12.14
See application file for complete search history.

(56) References Cited

U.S. PATENT DOCUMENTS

| | | | |
|---|---|---|---|
| 3,010,540 A | 6/1958 | Dahlen | |
| 3,699,689 A | 10/1972 | Haynes | |
| 4,058,188 A | 11/1977 | Vrillon | |
| 4,153,381 A | 5/1979 | Hawley | |
| 4,560,028 A * | 12/1985 | Perret | 181/288 |
| 4,875,429 A | 10/1989 | Murray et al. | |
| 5,409,199 A | 4/1995 | Kahmann | |
| 6,536,365 B1 | 3/2003 | Horton | |
| 6,901,617 B2 * | 6/2005 | Sprouse et al. | 5/654 |
| 7,235,736 B1 * | 6/2007 | Buller et al. | 136/251 |
| 2002/0162396 A1 * | 11/2002 | Genix et al. | 73/664 |
| 2003/0089075 A1 | 5/2003 | Oram | |
| 2007/0250026 A1 * | 10/2007 | Venturino et al. | 604/385.01 |
| 2008/0127877 A1 | 6/2008 | Ansay et al. | |

OTHER PUBLICATIONS

Wadley et al., "Dynamic Compression of Square Honeycomb Structures During Underwater Impulsive Loading", "Mathematical Sciences Publishers", Dec. 2007, pp. 2025-2048, vol. 2, No. 10, Publisher: Journal of Mechanics of Materials and Structures.

* cited by examiner

*Primary Examiner* — Max Noori
(74) *Attorney, Agent, or Firm* — Fogg & Powers LLC

(57) ABSTRACT

An energy absorber comprises at least one layer of energy absorbing material, each layer having a plurality of cells within the respective layer of energy absorbing material, wherein each layer of energy absorbing material deforms when a force applied to the at least one layer of energy absorbing material reaches a threshold force level; a fluid filling the plurality of cells in each respective layer of energy absorbing material; and a skin covering external surfaces of each respective layer of energy absorbing material to contain the fluid within the cells of the respective layer of energy absorbing material until the force applied to the energy absorbing material causes the respective layer to deform; wherein the threshold force level for each layer of energy absorbing material is based on a viscosity of the fluid in the cells of the respective layer and on a crush strength of the respective layer of energy absorbing material.

20 Claims, 4 Drawing Sheets

IMPACT ENERGY ABSORBER FOR UNDERWATER APPLICATIONS

GOVERNMENT LICENSE RIGHTS

This invention was made with U.S. Government support under Contract No. N00039-05-C-0009 awarded by the United States Navy. The U.S. Government has certain rights in the invention.

BACKGROUND

Many systems that are anticipated to impact a surface or object utilize shock mitigation techniques in order to reduce accelerations associated with the impact, and to ensure the survival and continued operation of the system following the impact. However, many of the conventional solutions are not useful for undersea applications. In particular, these conventional solutions do not adequately address concerns such as external pressure, corrosion and effects resulting from the incompressible nature of water. Conventional solutions which do address these concerns are often costly to implement.

SUMMARY

In one embodiment an energy absorber is provided. The energy absorber comprises at least one layer of energy absorbing material, each layer having a plurality of cells within the respective layer of energy absorbing material, wherein each layer of energy absorbing material deforms when a force applied to the at least one layer of energy absorbing material reaches a threshold force level; a fluid filling the plurality of cells in each respective layer of energy absorbing material; and a skin covering external surfaces of each respective layer of energy absorbing material to contain the fluid within the cells of the respective layer of energy absorbing material until the force applied to the energy absorbing material causes the respective layer to deform; wherein the threshold force level for each layer of energy absorbing material is based on a viscosity of the fluid in the cells of the respective layer and on a crush strength of the respective layer of energy absorbing material.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
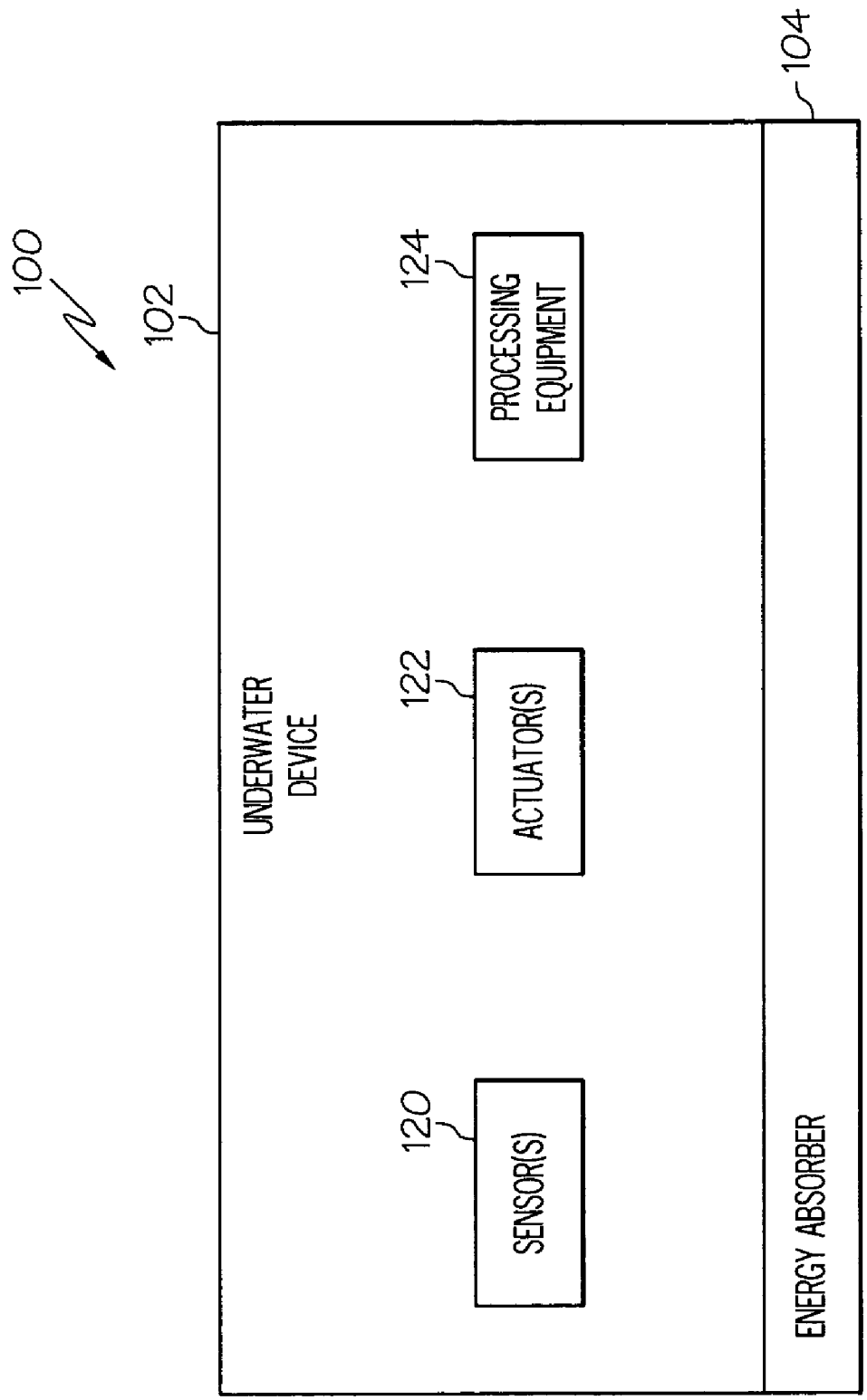
FIG. 1 is a block diagram of one embodiment of an underwater device.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a block diagram of one embodiment of an underwater system 100. The underwater system 100 includes underwater device 102 and energy absorber 104. The underwater device 102 is dependent on the specific implementation of the underwater system 100. The underwater device 102 includes one or more sensors 120 for gathering information about the environment around the underwater device 102, one or more actuators 122 for maneuvering the underwater device 102, and/or processing equipment 124 for processing sensor data and generating commands for the actuators 122. For example, in some embodiments, the underwater system 100 is a seafloor crawler configured for oil exploration. In such embodiments, the underwater device 102 includes one or more sensors 120, one or more actuators 122, and/or processing equipment 124 necessary for locating oil deposits. In other embodiments, the underwater system 100 is implemented as a seafloor crawler for marine research or as another underwater device and the underwater device 102 is implemented with sensors 120, actuators 122, and processing equipment 124 accordingly. The sensors 120, actuators 122, and processing equipment 124 are each configured for operation underwater. That is, each is configured to be water tight, resistant to water corrosion, etc. Additionally, it is to be understood that the sensors 102 and the actuators 122 are optional depending on the specific implementation of the underwater device 102.

The energy absorber 104 is located underneath the underwater device 102 such that the energy absorber 104, rather than the underwater device 102, impacts the sea floor. The kinetic energy of the underwater system 100 is, thus, absorbed by the energy absorber 104 to mitigate shock to the underwater device 102 due to the force from impacting the sea floor. In particular, once the impact force reaches a threshold force level, the energy absorber 105 deforms or buckles to absorb the kinetic energy. The absorption of energy is visually depicted in the exemplary graph shown in FIG. 2.

Figure 2:
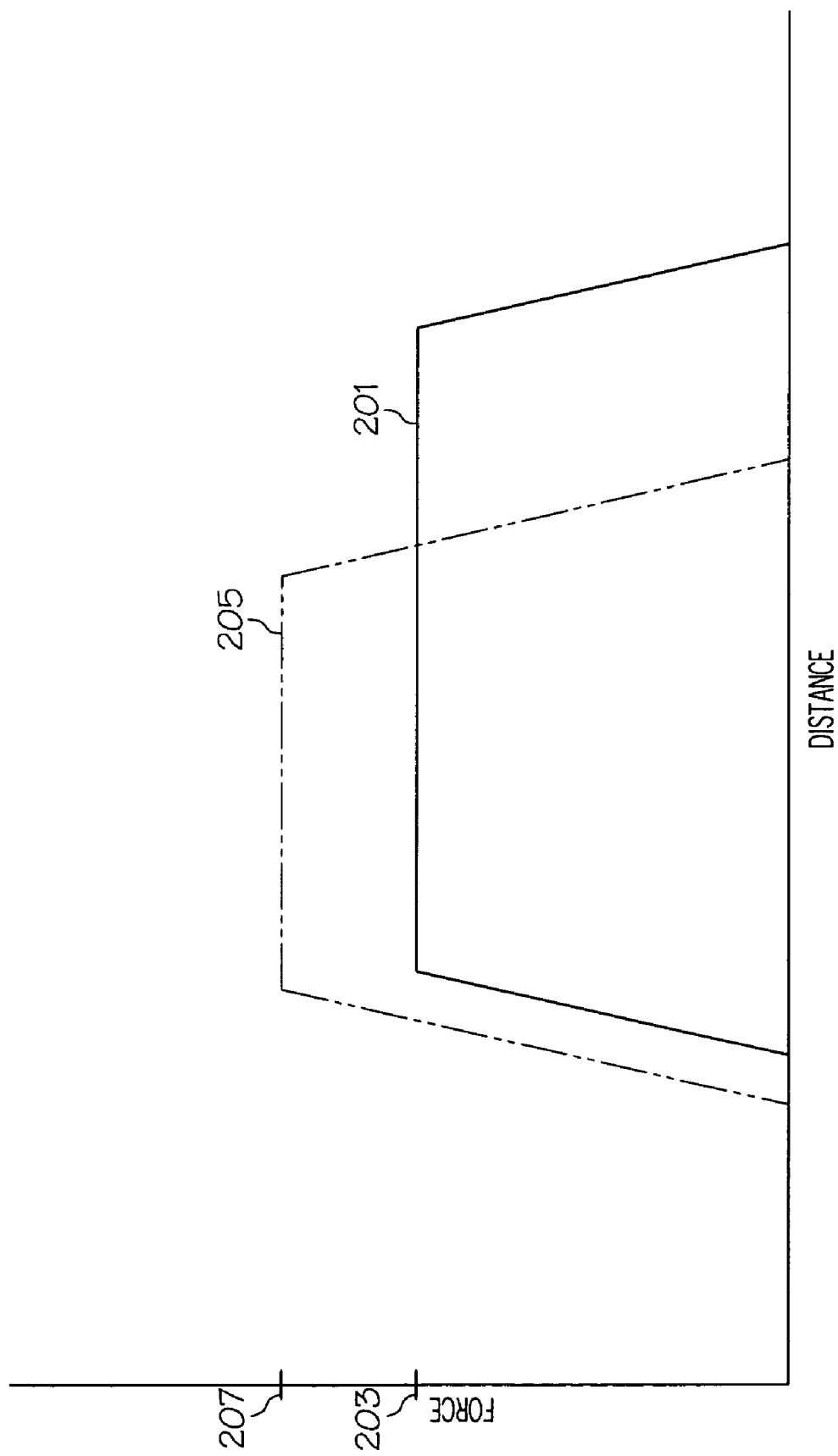
FIG. 2 is an exemplary graph depicting force level versus distance.

The exemplary graph in FIG. 2 depicts the force level versus distance. Since the amount of energy absorbed is proportional to the force times the distance displaced, the exemplary graph in FIG. 2 is useful in visualizing the energy absorbed by the energy absorber 104. It is to be understood that the graph in FIG. 2 is provided by way of explanation only and that actual graphs of force versus distance vary based on the parameters of the specific implementations of the energy absorber 104 and the underwater device 102.

As shown by curve 201, the impact force increases substantially linearly until the impact force reaches the threshold level 203. The threshold level 203 corresponds to the crush strength of the energy absorber 104. The crush strength is the amount of force necessary to cause the energy absorber 104 to deform or buckle. The crush strength is dependent on the properties of the specific implementation of the energy absorber 104, such as the material used, the structure of the material, etc. Once the threshold level 203 is reached, the level of force remains substantially constant as the energy absorber 104 deforms, thereby absorbing the kinetic energy. While the level of force remains constant, the deceleration of the underwater system 100 is also substantially constant. The following equation shows the relationship between the impact force and the acceleration/deceleration of the underwater system 100.

$$F = m \times a \qquad \text{Eq. 1}$$

In the known equation above, F is the impact force, m is the mass of the underwater system 100, and a is the acceleration (deceleration) of the underwater system 100. The shock (i.e. acceleration/deceleration) felt by the underwater system 100 is substantially mitigated by the energy absorber 104. In addition, the area under the curve 201 is equal to the amount of kinetic energy of the underwater system 100 when it impacts the sea floor. Thus, the energy absorber 104 substantially mitigates the shock to the underwater system 100 by absorbing the forces during impact. The velocity of the underwater system 100 is reduced as kinetic energy of the underwater system 100 is absorbed through the energy absorber 104.

Figure 3:
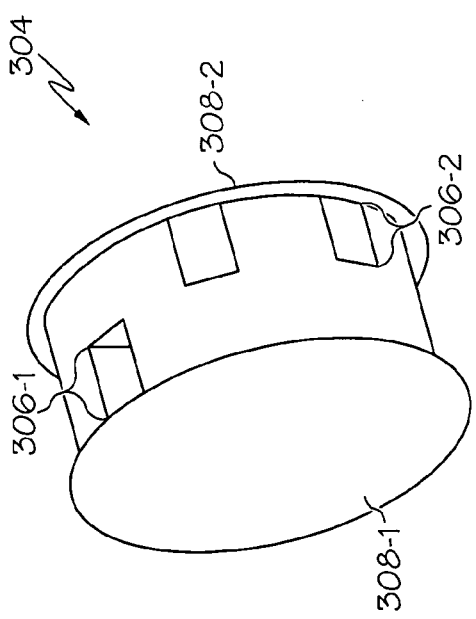
FIG. 3 is a diagram of one embodiment of an energy absorber.

An exemplary implementation of an energy absorber 304 is shown in FIG. 3. In the example shown in FIG. 3, the energy absorber 304 includes two layers of energy absorbing material 306-1 and 306-2. In addition, the energy absorber 304 includes two plates 308-1 and 308-2. The plate 308-1 is located on one end of the energy absorber 304 to aid in evenly spreading the force of impact with the sea floor across the energy absorber 304. The plate 308-2 is used to couple the energy absorber 304 to the underwater device 102. It is to be understood that the embodiment shown in FIG. 3 is provided by way of example and not by way of limitation. In particular, it is to be understood that other configurations can be used in other embodiments. For example, in another embodiment, a single layer of energy absorbing material 306 is used. In other embodiments, more than two layers of energy absorbing material 306 are used. Additionally, in some embodiments, plates 308 are not included, whereas in other embodiments, an additional plate 308 is located between each layer of energy absorbing material 306.

Figure 4:
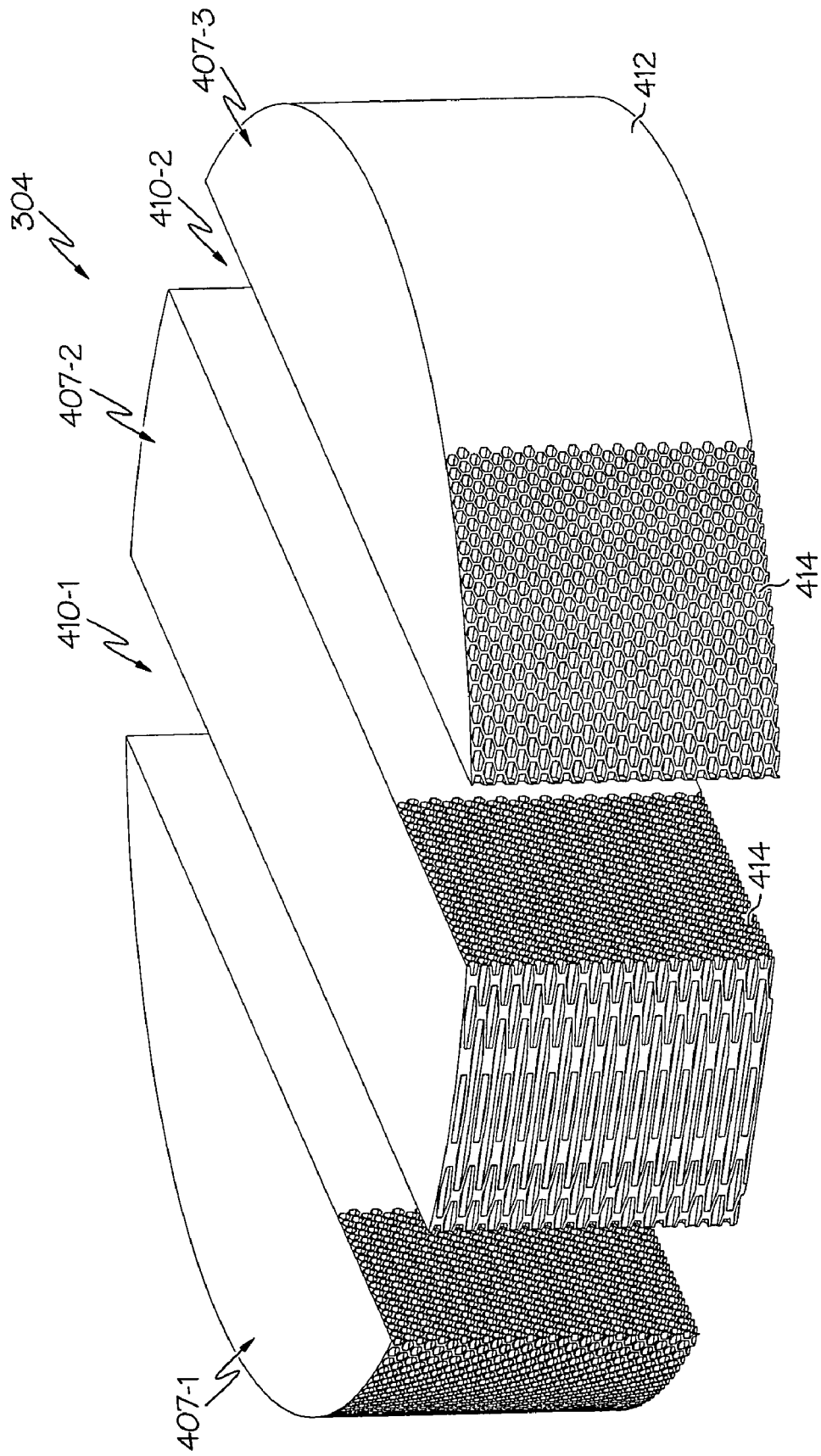
FIG. 4 is a perspective view of one embodiment of a layer of energy absorbing material in the energy absorber of FIG. 3.

FIG. 4 is a perspective view of one layer of energy absorbing material 306 used in the exemplary energy absorber 304. In this example, energy absorbing material 306 has a circular shape. However, it is to be understood that other shapes can be used in other embodiments. Additionally, in this exemplary embodiment, energy absorbing material 306 has two channels 410 which divide the energy absorbing material 306 into three sections 407-1, 407-2, and 407-3. The channels 410 aid in enabling each section 407 to expand parallel to the sea floor when being deformed by the force of impact with the sea floor. In addition, in some embodiments with more than one layer, the channels of the respective layers are offset from one another, as shown in the example in FIG. 3. In particular, the channels are offset 90 degrees in the example shown in FIG. 3.

Figure 5A:
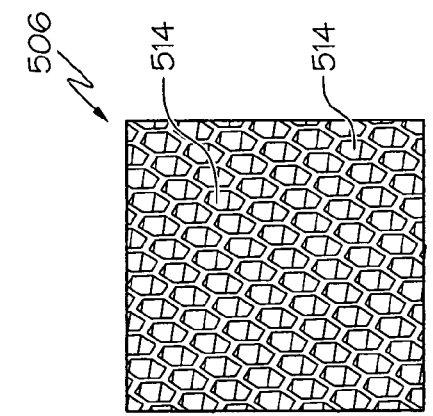
FIGS. 5A and 5B are cross-sectional views of one embodiment of an energy absorbing material.
Figure 5B:
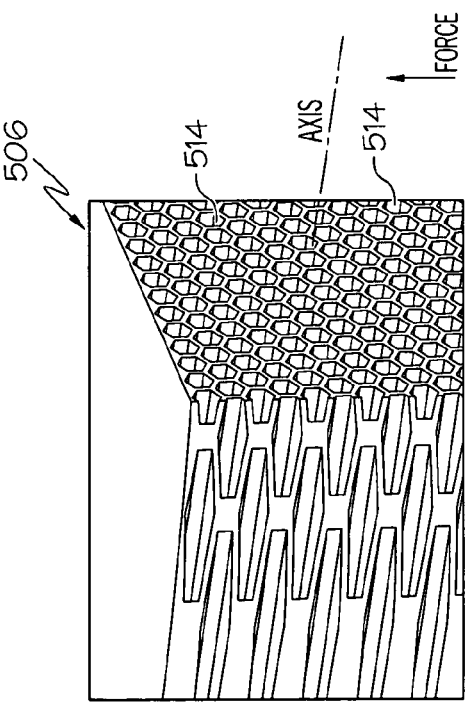

The energy absorbing material 306 can be implemented using one of a variety of available materials, such as, but not limited to, aluminum, copper, stainless steel, thermal plastics, polymer material, synthetic resins, etc. In addition, the energy absorber material 306 includes a plurality of cells 414 throughout the energy absorbing material 306. For example, in some embodiments, the energy absorbing material 306 is implemented as an open-cell foam, such as an open-cell metal foam or an open-cell polymeric foam. In another embodiment, the energy absorbing material 306 is implemented as a honeycomb material having cells which extend through the material. An exemplary honeycomb structure is shown in FIGS. 5A and 5B and described in more detail below.

The cells 414 in the energy absorbing material 306 are filled with a fluid. The fluid is selected based on the specific implementation of the underwater system 100. For example, in one embodiment, the fluid is an oil-based fluid with a low viscosity. In another embodiment, the fluid is a gel having a high viscosity. Alternatively, in another embodiment, the fluid is sea-water. Additionally, in some embodiments, the cells 414 are filled with air.

As the energy absorbing material 306 is deformed by the impact force, the fluid is expelled from the cells 414 which creates a drag on the inside of the cells 414. The drag, which is a function of the viscosity of the fluid, influences the threshold force level. In particular, the greater the drag, the greater the threshold force level required to expel the fluid and to deform the energy absorbing material 306. The threshold force level is a function of both the crush strength of the energy absorbing material 306 and the viscosity of the fluid. For example, the threshold force level, $F_T$, can be expressed by the following equation in which $F_C$ represents the crush strength of the energy absorbing material 306 and $F_D$ represents the force necessary to overcome the drag.

$$F_T = F_C + F_D \qquad \text{Eq. 2}$$

The drag can be adjusted by changing the fluid which fills the cells 414. The effect of the fluid on the threshold force level is shown by curve 205 in the exemplary graph in FIG. 2. Assuming that the curve 205 corresponds to the same energy absorbing material and underwater system as the curve 201, the drag due to the fluid increases the threshold force level to level 207. Additionally, the distance over which the force is applied to deform the energy absorbing material 306 is reduced as the area under the curves 201 and 205 is the same. This is due to the fact that some of the energy is absorbed in expelling the fluid from the cells 414.

Thus, the fluid can be selected to tune or adjust the threshold level without having to change the energy absorbing material 306, for example. Similarly, the fluid can be used to tune the threshold level force to more closely match the desired threshold force level in circumstances where a precise match is not made with the energy absorbing material 306. For example, in some situations, the amount of deceleration felt by the underwater system is restricted to a maximum deceleration. Thus, by inserting the maximum allowed deceleration into equation 1 above, the desired threshold force level can be attained by knowing the mass of the system. Equation 2 can then be used to determine the appropriate combination of fluid and energy absorbing material 306.

In addition to selecting the energy absorbing material 306 and the fluid to attain the desired threshold level of force, the energy absorbing material 306 also needs to be able to absorb the kinetic energy of the system. Thus, by estimating the kinetic energy of the underwater system when it impacts the sea floor, the properties of the energy absorbing material can be chosen accordingly. In particular, the ability of the energy absorbing material to absorb the kinetic energy is dependent on the material used, the size and shape of the cells 414, the size of ligaments in the energy absorbing material 306 which connect the cells 414, and the dimensions (width, height, and depth) of the energy absorbing material 306. In addition, the selected fluid also aids in absorbing the kinetic energy of the system as described above. Furthermore, each layer of energy absorbing material 306 can be tuned to have a separate threshold force level by selecting different fluids and/or by using different materials for each layer of energy absorbing material 306.

In some embodiments, such as when a fluid other than sea water is used or in an in-air application, energy absorber 104 includes a skin 412 which covers the exposed external surfaces of the energy absorbing material 306 to contain the fluid in the cells 414. The skin 412 breaks open to allow the fluid to exit when sufficient force is applied. The skin 412 is chosen such that the force needed to break open the skin is greater than the force applied to the skin 412 by the fluid contained within the cells 414 of the energy absorbing material 306. Any appropriate material which has sufficient strength to contain the fluid and which breaks open under sufficient force can be used for the skin 412. For example, a composite paper resin is used in some embodiments.

Additionally, in some embodiments, the skin 412 is selected such that the force needed to break open the skin 412 is much less than the threshold level of force, $F_T$, discussed above. In such embodiments, the force needed to break open the skin 412 does not significantly contribute to the threshold level of force. Alternatively, the skin 412 is chosen such that the force needed to break open the skin 412 is sufficient to aid in the energy absorption mechanism. Hence, in such embodiments, the threshold level of force, $F_T$, is a function of the crush strength of the energy absorbing material 306, the drag due to the fluid, and the strength of the skin 412 (i.e. the force needed to break open the skin 412).

FIG. 5 is a cross-sectional view of one embodiment of a honeycomb energy absorbing material 506. The honeycomb energy absorbing material 506 includes a plurality of open-ended cells 514. The shape of the cells 514 are defined by the ligaments 516. In this exemplary embodiment, the cells 514 have a hexagonal shape. However, it is to be understood that other shapes are used in other embodiments, such as, but not limited to, square and octagonal shapes. The crush strength of the energy absorbing material 506 is determined, in part, by the size and shape of the cells 514. In some exemplary embodiments, the average cell size is ¼ inch. However, other sizes can be used in other embodiments. In addition to the cell size and shape, the thickness of the ligaments 516 and the type of material used also influence the crush strength of the energy absorbing material 506.

The cells 514 are oriented such that the axes of the cells 514 are parallel to the surface being impacted (e.g. the sea floor) and perpendicular to the direction of the force, as shown in the perspective view in FIG. 5B. The axis of each cell extends through the center of the cell from one open end to the other open end as shown in FIG. 5B. In this orientation, sea water or other fluid which fills the cells 514 is expelled from the cells 514 when the honeycomb energy absorbing material 506 deforms rather than being entrained in the cells 514. Hence, the fluid filling the cells can be used to aid in the energy absorption mechanism as described above.

Although specific embodiments have been illustrated and described herein, it will be appreciated by those of ordinary skill in the art that any arrangement, which is calculated to achieve the same purpose, may be substituted for the specific embodiments shown. For example, although the embodiments described herein are discussed in terms of an underwater system, it is to be understood that in other embodiments, an in-air system can be used. Therefore, it is manifestly intended that this invention be limited only by the claims and the equivalents thereof.

What is claimed is:

1. An energy absorber comprising:
    at least one layer of energy absorbing material, each layer having a plurality of cells within the respective layer of energy absorbing material, wherein each layer of energy absorbing material deforms when a force applied to the at least one layer of energy absorbing material reaches a threshold force level;
    a fluid filling the plurality of cells in each respective layer of energy absorbing material; and
    a skin covering external surfaces of each respective layer of energy absorbing material to contain the fluid within the cells of the respective layer of energy absorbing material, wherein the skin is configured to break open, allowing the fluid to be expelled, when the force applied to the energy absorbing material causes the respective layer to deform;
    wherein the threshold force level for each layer of energy absorbing material is based on a viscosity of the fluid in the cells of the respective layer and on a crush strength of the respective layer of energy absorbing material.

2. The energy absorber of claim 1, wherein the energy absorbing material comprises a honeycomb material, wherein an axis of the cells within the honeycomb material is oriented parallel to an impact surface.

3. The energy absorber of claim 1, wherein the energy absorbing material comprises an open-cell foam.

4. The energy absorber of claim 1, wherein the threshold force level is further based on a strength of the skin.

5. The energy absorber of claim 1, wherein the energy absorbing material comprises one of aluminum, copper, stainless steel, thermal plastic, polymer material, and synthetic resin.

6. The energy absorber of claim 1, wherein each of the at least one layers of energy absorbing material comprises at least one channel which divides the respective layer of energy absorbing material into a plurality of sections.

7. The energy absorber of claim 6, wherein the at least one layer of energy absorbing material includes two layers of energy absorbing material, wherein the at least one channel in one of the two layers is offset from the at least one channel in the other layer.

8. An energy absorber comprising:
    at least one layer of honeycomb material having a plurality of cells within the honeycomb material; and
    wherein an axis of the plurality of cells in each layer of the honeycomb material is oriented parallel to an impact surface such that the fluid is expelled from the plurality of cells when a force due to impact with the impact surface reaches a threshold force level causing the respective layer of honeycomb material to deform;
    wherein the threshold force level for each layer of honeycomb material is based, at least in part, on a crush strength of the respective layer of energy absorbing material.

9. The energy absorber of claim 8, further comprising:
    a fluid filling the plurality of cells in each respective layer of honeycomb material;
    wherein the threshold force level for each layer of honeycomb material is further based on the viscosity of the fluid in the cells of the respective layer.

10. The energy absorber of claim 9, wherein the fluid filling the plurality of cells is sea water.

11. The energy absorber of claim 9, further comprising a skin covering external surfaces of each respective layer of honeycomb material to contain the fluid within the cells of the respective layer of honeycomb material until the force due to impact with the impact surface causes the respective layer of honeycomb material to deform.

12. The energy absorber of claim 11, wherein the threshold force level is further based on a strength of the skin.

13. The energy absorber of claim 8, wherein each of the at least one layers of honeycomb material comprises at least one channel which divides the respective layer of energy absorbing material into a plurality of sections.

14. The energy absorber of claim 13, wherein the at least one layer of honeycomb material includes two layers of honeycomb material, wherein the at least one channel in one of the two layers is offset from the at least one channel in the other layer.

15. An underwater system comprising:
   an underwater device comprising at least one of a plurality of sensors, a plurality of actuators, and processing equipment, each configured for operation underwater; and
   an energy absorber coupled to the underwater device such that the energy absorber is located between the underwater device and an impact surface, wherein the energy absorber comprises:
   at least one layer of honeycomb material having a plurality of cells within the honeycomb material; and
   a fluid filling the plurality of cells in each respective layer of honeycomb material;
   wherein an axis of the plurality of cells in each layer of the honeycomb material is oriented parallel to the impact surface such that the fluid is expelled from the plurality of cells when a force due to impact with the impact surface reaches a threshold force level causing the respective layer of honeycomb material to deform;
   wherein the threshold force level for each layer of honeycomb material is based on a viscosity of the fluid in the cells of the respective layer and on a crush strength of the respective layer of energy absorbing material.

16. The underwater system of claim 15, wherein the fluid filling the plurality of cells is sea water.

17. The underwater system of claim 15, wherein each of the at least one layers of honeycomb material comprises at least one channel which divides the respective layer of energy absorbing material into a plurality of sections.

18. The underwater system of claim 17, wherein the at least one layer of honeycomb material includes two layers of honeycomb material, wherein the at least one channel in one of the two layers is offset from the at least one channel in the other layer.

19. The underwater system of claim 15, further comprising a skin covering external surfaces of each respective layer of honeycomb material to contain the fluid within the cells of the respective layer of honeycomb material until the force due to impact with the impact surface causes the respective layer of honeycomb material to deform.

20. The underwater system of claim 19, wherein the threshold force level is further based on a strength of the skin.

* * * * *